Oct. 3, 1933.   P. E. COMI   1,928,661

MOTION PICTURE PROJECTOR ATTACHMENT

Filed June 24, 1929

Inventor
Pierino E. Comi
by A. W. Harrison
Attorney

Patented Oct. 3, 1933

1,928,661

UNITED STATES PATENT OFFICE 1,928,661

MOTION PICTURE PROJECTOR ATTACHMENT

Pierino Edward Comi, Boston, Mass., assignor, by mesne assignments, to Joseph D. Basson, Brooklyn, N. Y.

Application June 24, 1929. Serial No. 373,444

8 Claims. (Cl. 88—17)

This invention relates to motion picture projectors and has particular reference to projectors employed for the so-called sound pictures or "talkies" which require the use of arc lights of much higher intensity than for ordinary motion pictures.

The heat of the beam or ray of light supplied by the arc lamps employed is so intense that for the sake of safety in theaters it is quite essential that a material reduction shall be effected in the degree of the heat of the beam at the film trap of the machine, to avoid risk of causing the film to ignite. Several attempts have been made to attain safety by cooling the beam of light, but so far as I am aware, all have necessitated more or less reconstruction of the projector.

The object of my invention is to provide a simple intercepting mechanism capable of being installed in or attached to an otherwise complete motion picture projector whether the latter is waiting sale or is already installed in use in a theater, which mechanism not only rapidly and intermittently intercepts the concentrated ray of light on its way from the hood or cone of the arc lamp to the intermittently travelling film, but also causes a circulation of air that reduces the heat of the beam which reaches the film to such a low degree that there is no possibility of causing combustion. A further object is to provide an improved means for permitting a light interceptor or shutter to be readily installed and synchronized with the intermittent feed of a film, said synchronization in part being possible by reason of the provision of a simple and efficient form of support for the shutter and its shaft so that the shutter may be disposed at the rear of the head. This novel form of support provided in its preferred form is so arranged that it can be readily attached to a standard machine with minimum alteration of the usual mechanism and may, if desired, be built into the machine during the original manufacture thereof.

A still further object of this invention is to provide a novel form of support and associated mechanism so that the number of gears employed to drive the light interceptor or shutter at the rear of the head remains the same as heretofore, even though the position of the shutter shaft may be changed.

With the above stated object in view, the invention consists in the construction and combination of parts substantially as hereinafter described and claimed.

Of the accompanying drawing which illustrates my invention as applied to a well-known type of projector such as the "Simplex":—

Similar reference characters indicate similar parts or features in all of the views.

Figures 2, 3, 4:
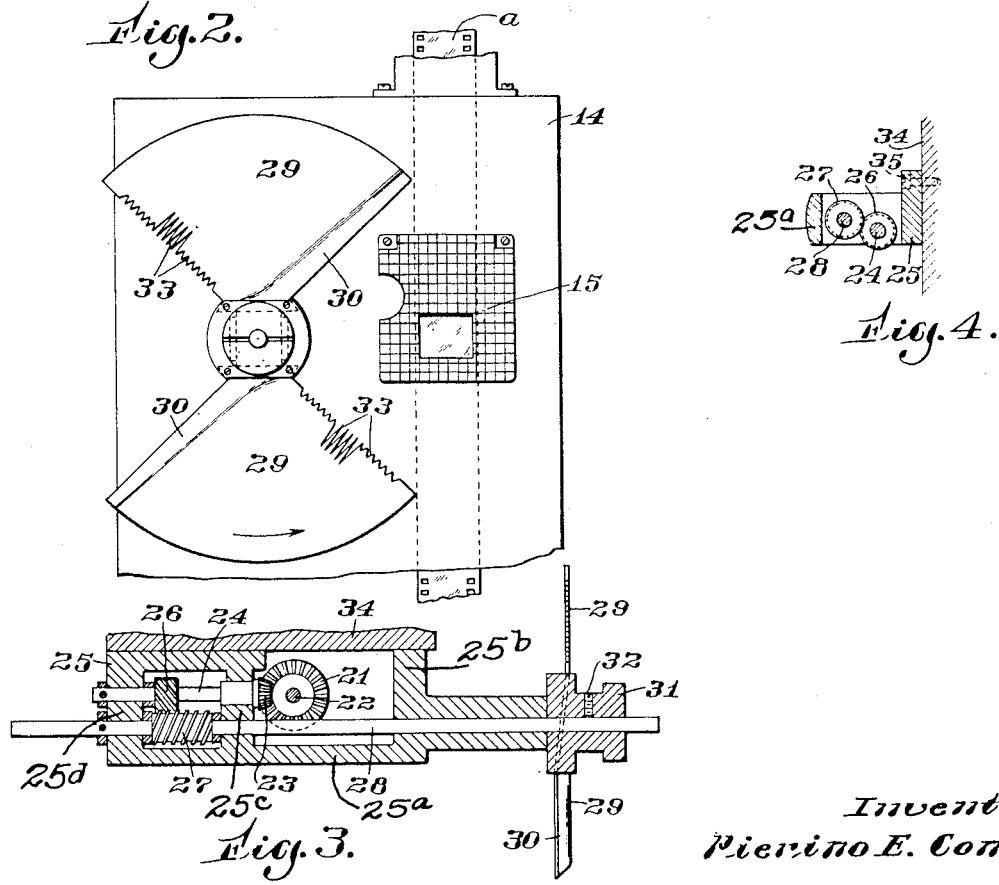
Figure 2 is a view looking in the direction of the arrow 2 near Figure 1.
Figure 3 represents a section on line 3—3 of Figure 1.
Figure 4 represents a section on line 4—4 of Figure 1.

The usual hood or cone of the arc lamp is indicated at 12, said cone having the customary dowser 13. At the usual distance from the cone 12 is the center frame 14 of the portion of the machine through which the film $a$ (Fig. 2) is caused to travel rapidly and intermittently, said film passing the heat shield 15 of the film trap at which point the beam of light from the arc lamp is concentrated.

Figure 1:
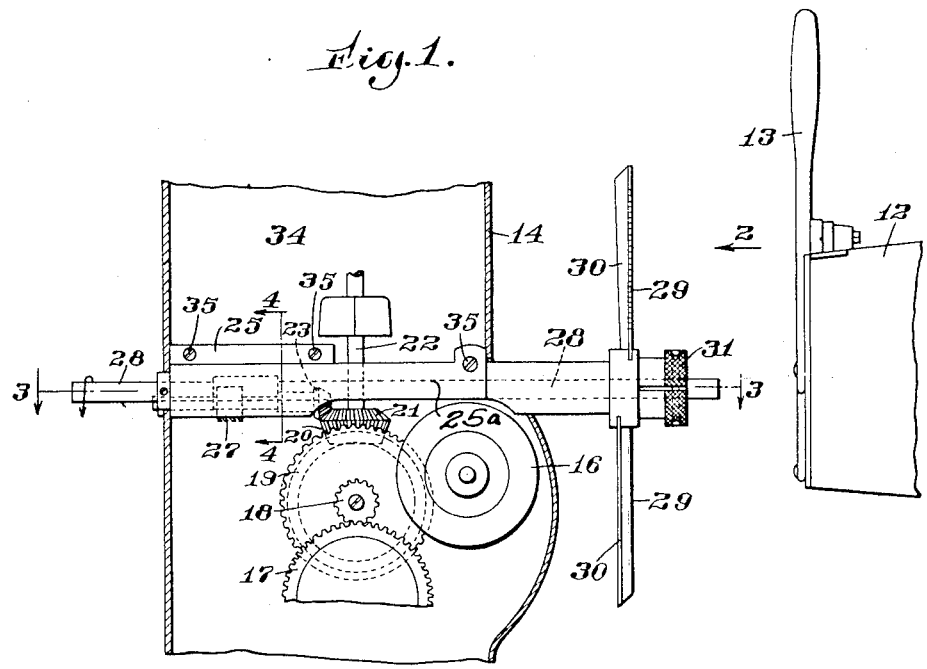
Figure 1 is a side elevation, partly in section, illustrating only such parts of the projector itself as necessary to an understanding of the present invention.

Some of the other parts of the well-known machine consist of the intermittent fly wheel 16, the main drive gear 17 meshing with a pinion 18 axially connected with the gear 19, the latter having a bevel gear portion indicated by dotted lines in Figure 1 meshing with a bevel pinion 20 above which is another bevel pinion 21, both of the pinions 20, 21, being carried by a vertical shaft 22.

Referring now to the parts which are included in or relate to my present invention, the pinion 21 meshes with a bevel pinion 23 (Figs. 1 and 3) carried by the usual counter shutter drive shaft 24 mounted in a housing or bracket 25, said shaft 24 having a worm gear 26 meshing with a worm gear 27 carried by a shaft 28 also mounted in the housing or bracket. This worm gear 26 in its usual function constitutes the usual shutter drive and also acts as the framing gear employed on practically all standard machines to rotate the shutter a limited amount when the film is being framed. This gear 26 can be slid along shaft 24 without being rotated so as to frame the shutter 29. This type of structure is, for instance, well known as shown in Dina Patent 1,746,385, particularly parts 18, 19, 20, 21, 22, and 37 in Figure 1. The shaft 28 extends toward the lamp hood or cone but is not in line with the beam of light which, in use, is projected to the film. Secured to the shaft 28 are two blades 29 the rear edges of which are bent slightly out of the plane of the main areas of the blades as indicated at 30. The main portions or areas of said blades are preferably flat in the plane of their rotation and only their rear edges 30 are bent out of said plane. Therefore, although the speed of rotation is very rapid as usual for the shutter of a motion picture projector, such rotation causes no flickering although the rear edges are bent to act as fans. Said fans are mounted in a hub 31 fitting the end of the shaft and adjustably secured thereto as by means of a screw 32. The adjustment just referred to is for the purpose of facilitating accurate position of the blades on the shaft for synchronizing their action in intercepting the beam.

The front edges of the fan blades, the edges which, during revolution, first intercept the light beam, are not straight but are somewhat saw-toothed, the notches varying in depth but not in width. This is to give a dissolving effect and avoiding an appearance of the picture flickering.

The housing or bracket 25 which carries the parts just described is secured to the usual wall member 34 of center frame 14 of the known projector by screws 35, and therefore said bracket and the parts carried thereby can be attached to an otherwise complete motion picture projector without necessitating any reconstruction of the latter. It will be noted that in the drawing this bracket 25 is shown in one piece, but it is to be understood that the portion of the bracket which supports the shaft 28 and the worm gear 27 may be a separate part of the device from the remainder of the bracket which supports the shaft 24 and the worm gear 26. Thus the bracket in either form may be readily attached to a standard machine. In either form the bracket 25 is provided with a frontwall or main body portion 25a which is connected to the member 34 by means of spacing elements such as 25b, 25c, and 25d. The wall 25a or the spacing elements are provided with suitable journals to receive the shutter shaft 28, for the purpose of holding it the proper distance from the wall 34 and at the proper relation to the counter shaft 24. Referring to the Dina Patent 1,746,385, it will be noted that the shutter shaft for front operation is mounted above the counter shaft 20, see Figure 1. It will be observed however that therein the shutter shaft 18 could not be extended to the rear of the head because it would be prevented by the drive mechanism.

The present invention by means of the bracket 25 permits the ordinary front shutter shaft such as shaft 18 of the Dina patent to be swung down into a position at the side of the counter shaft 24 so that when this shaft is extended to the rear of the head it will be clear of the driving mechanism. Usually it is desirable to swing this shaft and gear 27 down from the vertical until it takes a position about 20 degrees from the horizontal, while at the same time the drive and framing gear 26 remains directly in mesh with the worm gear 27 on the shutter shaft. Ordinarily the shutter shaft for front operation is rather short and therefore when it is swung down as above stated, an addition or extension may be made thereto to enable it to reach the rear of the head, or a new shaft of suitable length may replace the ordinary short shaft.

In operation, the rotation of the shaft 28 is so synchronized relatively to the usual intermittent feed of the film strip a that one or the other of the blades 29 will shut off the beam of light from reaching the film during each step of travel of the film and pass beyond so that the beam will reach the film during each fraction of a second that the film is stationary. In other words, the blades intermittently or alternately prevent and permit the beam of light from the arc lamp reaching the film in synchronism with the intermittent feed or travel of the film. This rapid constant interruption of the light ray, coupled with the circulation of air in an open or free space caused by the revolving blades, reduces by some 65 per cent the temperature which can exist in the portion of the machine through which the film travels. The heat of the arc lamp beam which reaches the film during any chosen period of time is only about one-third of the heat which does reach a film in an ordinary projector employing no interrupting device or mechanism. This is due not only to the synchronized interruption of the beam directed to the film, but also the high speed of the blades in an open or free space.

It will thus be seen that among the advantages of this invention there is the decided advantage of permitting the ordinary shutter shaft employed in the usual front shutter operation to be displaced from its ordinary position to permit the shutter to be positioned so that it may operate at the rear of the machine. This desirable object is achieved by means of the simple, compact support member which can be readily attached to the head and thereby firmly support the shutter in its displaced position while the shutter shaft is driven by the same gearing as before and can be synchronized with the film and the shutter frame by the same original mechanism. Thus, without increasing the number of gears a new disposition of the shutter is achieved by means of introducing a simple support which allows one of the main objects of the invention to be accomplished, and by placing the shutter to operate in the cone of light between the hood and the head, a great deal of heat is prevented from ever reaching the head.

It will further be noted by inspection of the drawing that there is a relatively long journal extending from the main body of the bracket to give an added support to the shutter shaft. It will also be noted by inspection of Figs. 3 and 4 that a plane in which the axes 24 and 28 lie would be at an angle to a plane passing vertically through the projection machine, as for instance a plane passing vertically through wall member 34 of the center frame.

Other advantages of the combined light interrupter and air circulator such as described and illustrated herein are that the film is prevented from buckling thereby giving clearer definition and more depth to the picture being shown, and also serving to prevent the in and out of focus effects heretofore frequently experienced in theaters which use high intensity arc lamps. This improved efficient operation of the film with a considerable reduction of the projected heat, is made possible largely by the provision of the above described simple detachable support which permits the ready repositioning of the shutter shaft.

While the invention has been described in detail and with respect to a present preferred form thereof, it is not to be limited to such details and forms since many changes and modifications may be made and the invention embodied in other forms and modifications without departing from the spirit and scope of the invention in its broadest aspects. Hence it is desired to cover any and all forms of the invention which may come within the language or scope of the appended claims.

What is claimed, is:

1. In combination, a motion picture projection machine adapted for front shutter operation and having means for supporting the main drive shaft and gears, a shaft supporting bracket structure separately attachable to said machine, a counter-shaft and a shutter-shaft supported thereon, a gear mounted on said counter-shaft for connecting it with a gear driven by the main drive shaft, a second gear mounted on said counter shaft, a gear carried by said shutter shaft and being in direct engagement with the second gear on said counter-shaft, said shutter-shaft being mounted in said bracket structure to extend to the rear of said machine and to clear said main drive shaft and gears to permit the driving of a shutter at the rear of said machine.

2. In combination, a motion picture projection machine adapted for front shutter operation and having means for supporting the main drive shaft and gears, a shaft supporting bracket structure separately attachable to said machine, a counter-shaft and a shutter-shaft supported thereon, a gear mounted on said counter-shaft for connecting it with a gear driven by the main drive shaft, a second gear mounted on said counter shaft and being slidable non-rotatably on said counter shaft to turn the shutter shaft to adjust a shutter carried thereon, a gear carried by said shutter shaft and being in direct engagement with the second gear on said counter-shaft, said shutter-shaft being mounted in said bracket structure to extend to the rear of said machine and to clear said main drive shaft and gears to permit the driving of a shutter at the rear of said machine.

3. In combination, a motion picture projection machine adapted for front shutter operation and having means for supporting the main drive shaft and gears, a shaft supporting bracket structure separately attachable to said machine, a counter-shaft and a shutter-shaft supported thereon, a gear mounted on said counter-shaft for connecting it with a gear driven by the main drive shaft, a second gear mounted on said counter shaft, a gear carried by said shutter shaft and being in direct engagement with the second gear on said counter-shaft, said shutter-shaft being mounted in said bracket structure to extend to the rear of said machine and to clear said main drive shaft and gears to permit the driving of a shutter at the rear of said machine, the axes of the shutter-shaft and the counter-shaft lying in a plane which forms an angle with a plane passing vertically through said machine.

4. In combination, a motion picture projection machine adapted for front shutter operation and having means for supporting the main driving shaft and gears, a shaft supporting bracket separately attachable to said supporting means, a counter-shaft and a shutter-shaft supported thereon, said bracket being of greater width than depth and provided with means to support the shutter-shaft and counter-shaft in parallel relation therein with their axes lying in a plane which forms an angle with a plane passing vertically through said machine, said bracket having an inner face for engaging the main support, said face being substantially parallel to the axes of said counter and shutter-shafts to support them away from said main support and parallel thereto, a gear mounted on one end of said counter-shaft for connecting it with a gear driven by the main drive shaft, a second gear mounted on said counter-shaft, a gear carried by said shutter-shaft and being in direct engagement with the second gear on said counter-shaft, said shutter-shaft being mounted in said bracket to extend to the rear of the machine and to clear said main drive shaft and gears to permit the driving of a shutter at the rear of said machine.

5. In combination, a motion picture projection machine adapted for front shutter operation and having means for supporting the main driving shaft and gears, a shaft supporting bracket separately attachable to said supporting means, a counter-shaft and a shutter-shaft supported thereon, said bracket being of greater width than depth and provided with journal means to support the counter and shutter-shafts in offset relation from the main support and parallel to each other and with the shutter-shaft furthest from the main support, the axes of the counter and shutter-shafts lying in a plane which forms an angle with a plane passing vertically through said machine, an inner face in said bracket engaging the support and being disposed substantially parallel to the axes of the counter and shutter-shafts to dispose them substantially parallel to the support, the offset shutter shaft extending to the rear of the machine and clearing the main drive shaft and gears to permit the driving of a shutter carried by said shutter-shaft at the rear end thereof, a journal extending from the main body of said bracket and toward the rear of the machine for giving added support to the shutter shaft, a gear mounted on one end of said counter-shaft for connecting it with a gear driven by the main drive shaft, a second gear mounted on said counter-shaft, and a gear carried by said shutter-shaft and being in direct engagement with the second gear on said counter-shaft.

6. The combination with a projector for drivingly supporting a shutter at the front end thereof having a wall plate and drive parts including a vertically extending shaft mounted on one side of said wall plate, of a bracket detachably secured to said wall plate having two parallel shaft bearings to form the bearings for an inner horizontally extending shaft and an outer horizontally extending shaft, the axial center of the outer of said shaft bearings being disposed laterally outward of, and clearing said vertically extending shaft, and two horizontally extending shafts journaled in said bearings, the inner of said horizontally extending shafts being drivingly connected to said vertically extending shaft, the outer of said horizontally extending shafts being drivingly connected to said inner horizontally extending shaft and passing clear of said vertically extending shaft in its extent to the rear end of said wall plate for drivingly mounting a shutter at such rear end of said wall plate.

7. The combination with a projector for drivingly supporting a shutter at the front end thereof having a side wall and drive parts operatively mounted on said side wall, of a bracket detachably connected to said side wall having two shaft bearings, and two horizontally extending shafts mounted in said bearings, one of said horizontally extending shafts being drivingly connected to said drive parts, the second of said horizontally extending shafts being drivingly connected to said first horizontally extending shaft and extending clear of said drive parts in its extent rearwardly of said side wall to form a support for the shutter at the rear end of said side wall, the axial center of the bearings in said bracket for said second shaft being disposed laterally outward of, and clearing said drive parts.

8. The combination with a projector for drivingly supporting a shutter at the front end thereof having a wall plate and drive parts including a vertically extending shaft mounted on one side of said wall plate, of bearing supports extending from said wall plate to form the bearings for an inner horizontally extending shaft and an outer horizontally extending shaft, the axial center of the outer of said shaft bearings being disposed laterally outward of, and clearing said vertically extending shaft, and two horizontally extending shafts journaled in said bearings, the inner of said horizontally extending shafts being drivingly connected to said vertically extending shaft, the outer of said horizontally extending shafts being drivingly connected to said inner horizontally extending shaft and passing clear of said vertically extending shaft in its extent to the rear end of said wall plate for drivingly mounting a shutter at such rear end of said wall plate.

PIERINO EDWARD COMI.